United States Patent
Arbore et al.

(10) Patent No.: US 6,909,538 B2
(45) Date of Patent: Jun. 21, 2005

(54) FIBER AMPLIFIERS WITH DEPRESSED CLADDING AND THEIR USES IN ER-DOPED FIBER AMPLIFIERS FOR THE S-BAND

(75) Inventors: Mark A. Arbore, Los Altos, CA (US); Gregory L. Keaton, San Francisco, CA (US)

(73) Assignee: Lightwave Electronics, Mountain View, CA (US)

( * ) Notice: Subject to any disclaimer, the term of this patent is extended or adjusted under 35 U.S.C. 154(b) by 400 days.

(21) Appl. No.: 10/095,303

(22) Filed: Mar. 8, 2002

(65) Prior Publication Data

US 2003/0169488 A1 Sep. 11, 2003

(51) Int. Cl.[7] ................................................ H01S 3/00
(52) U.S. Cl. ..................................................... 359/341.1
(58) Field of Search ......................... 359/341.1; 385/127

(56) References Cited

U.S. PATENT DOCUMENTS

| | | |
|---|---|---|
| 4,515,436 A | 5/1985 | Howard et al. |
| 4,764,933 A | 8/1988 | Kozlovsky et al. |
| 5,056,888 A | 10/1991 | Messerly et al. |
| 5,059,230 A | 10/1991 | Mollenauer et al. |
| 5,260,823 A | 11/1993 | Payne et al. |
| 5,323,404 A | 6/1994 | Grubb |
| 5,392,154 A | 2/1995 | Chang et al. |
| 5,452,116 A | 9/1995 | Kirkby et al. |
| 5,473,714 A | 12/1995 | Vengsarkar |
| 5,673,342 A | 9/1997 | Nelson et al. |
| 5,801,858 A | 9/1998 | Roberts et al. |
| 5,818,630 A | 10/1998 | Fermann et al. |
| 5,838,867 A | 11/1998 | Onishi et al. |
| 5,867,305 A | 2/1999 | Waarts et al. |
| 5,880,877 A | 3/1999 | Fermann et al. |
| 5,892,615 A | 4/1999 | Grubb et al. |
| 5,930,030 A | 7/1999 | Scifres |
| 5,933,271 A | 8/1999 | Waarts et al. |
| 6,021,141 A | 2/2000 | Nam et al. |
| 6,049,417 A | 4/2000 | Srivastava et al. |
| 6,118,575 A | 9/2000 | Grubb et al. |
| 6,154,321 A | 11/2000 | Melville et al. |
| 6,181,465 B1 | 1/2001 | Grubb et al. |
| 6,212,310 B1 | 4/2001 | Waarts et al. |
| 6,278,816 B1 | 8/2001 | Keur et al. |
| 6,301,271 B1 | 10/2001 | Sanders et al. |
| 6,307,994 B1 | 10/2001 | Paek et al. |
| 6,445,494 B1 | 9/2002 | Nilsson et al. ............ 359/341.1 |
| 6,556,757 B2 | 4/2003 | Ellison et al. ............... 385/127 |
| 6,563,995 B2 * | 5/2003 | Keaton et al. ............... 385/127 |
| 6,633,429 B2 * | 10/2003 | Kinoshita et al. ......... 359/337.1 |

OTHER PUBLICATIONS

MacCormack et al., "High–speed, high–power double–clad fiber amplifiers" CLEO 1998, Technical Digest. May 3–8, 1998.

(Continued)

*Primary Examiner*—Mark Hellner
(74) *Attorney, Agent, or Firm*—Lumen Intellectual Property Services, Inc.

(57) ABSTRACT

A fiber amplifier in a depressed cladding or W-profile fiber. The fiber has a core doped with the active material and defined by a core cross-section and a refractive index $n_o$. A depressed cladding of index $n_1$ surrounds the core and a secondary cladding of index $n_2$ surrounds the depressed cladding. The fiber amplifier is pumped to a level of high relative inversion, such that the active material exhibits positive gains in a short wavelength band and high gains in a long wavelength band. The core cross-section, the depressed cladding cross-section and the refractive indices $n_o$, $n_1$, and $n_2$ are selected to obtain a roll-off loss curve about a cutoff wavelength $\lambda_c$. The roll-off loss curve yields losses at least comparable to the high gains in the long wavelength band and losses substantially smaller than the positive gains in the short wavelength band.

43 Claims, 7 Drawing Sheets

OTHER PUBLICATIONS

L.G. Cohen et al., "Radiating Leaky–Mode Losses in Single–Mode Lightguides with Depressed–Index Claddings," IEEE Journal of Quantum Electronics, vol. QE–18, No. 10, Oct. 1982, pp. 1467–1472.

Ishikawa et al., "Novel 1500 nm–Band EDFA with Discrete Raman Amplifier," ECOC–2001, Post Deadline Paper.

Stolen et al, "Short W–Tunneling Fibre Polarizers," Electronics Letters, vol. 24, 1988, pp. 524–525.

* cited by examiner

FIBER AMPLIFIERS WITH DEPRESSED CLADDING AND THEIR USES IN ER-DOPED FIBER AMPLIFIERS FOR THE S-BAND

RELATED APPLICATIONS

This application is related to U.S. application Ser. No. 09/825,148 filed on Apr. 2, 2001.

FIELD OF THE INVENTION

The present invention relates generally to fiber amplifiers in W-profile fibers, and in particular to S-band Er-doped fiber amplifiers with distributed suppression of amplified spontaneous emissions (ASE) in the C- and L-bands and a method for designing such fiber amplifiers.

BACKGROUND OF THE INVENTION

Optical waveguides are designed to guide light of various modes and polarization states contained within a range of wavelengths in a controlled fashion. Single-mode optical fiber is the most common waveguide for long-distance delivery of light. Other waveguides, such as diffused waveguides, ion-exchanged waveguides, strip-loaded waveguides, planar waveguides, and polymer waveguides are commonly used for guiding light over short distances and especially for combining or separating light of different wavelengths, optical frequency mixing in nonlinear optical materials, modulating light and integrating many functions and operations into a small space.

In essence, a waveguide is a high refractive index material, usually referred to as the core in an optical fiber, immersed in a lower index material or structure, usually referred to as the cladding, such that light injected into the high index material within an acceptance cone is generally confined to propagate through it. The confinement is achieved because at the interface between the high and low index materials the light undergoes total internal reflection (TIR) back into the high index material.

The problem of amplifying optical signals for long distance transmission was successfully addressed by the development of Erbium doped fiber amplifiers (EDFAs). An EDFA consists of a length of silica fiber with the core doped with ionized atoms ($Er^{3+}$) of the rare earth element Erbium. The fiber is pumped with a laser at a wavelength of 980 nm or 1480 nm. The doped, pumped fiber is optically coupled with the transmission fiber so that the input signal is combined with the pump signal in the doped fiber. An isolator is generally needed at the input and/or output to prevent reflections that would convert the amplifier into a laser. Early EDFAs could provide 30 to 40 dB of gain in the C-band extending between 1530 to 1565 nm with noise figures of less than 5 dB. Recently, EDFAs have been developed that can provide 25 dB of gain in the L-band (1565 to 1625 nm) as well as in the C-band.

There is great interest in the telecommunications industry to make use of the optical spectrum range with wavelengths shorter than those currently achievable with conventional C-band and L-band EDFAs. This wavelength range, commonly called the "S-band" or "short-band" is poorly defined because there is no consensus on the preferred amplifier technology. In general, however, the S-band is considered to cover wavelengths between about 1425 nm and about 1525 nm.

The gain in the S-band typically observed in EDFAs is limited by several factors, including incomplete inversion of the active erbium ions and by amplified spontaneous emissions (ASE) or lasing from the high gain peak near 1530 nm. Unfortunately, at present no efficient mechanism exist for suppressing ASE at 1530 nm and longer wavelengths in an EDFA.

At this time, the prior art offers various types of waveguides and fibers in which an EDFA can be produced. It is therefore useful to briefly review prior art fibers and waveguides.

Most waveguides are designed to prevent injected light from coupling out via mechanisms such as evanescent wave out-coupling (tunneling), scattering, bending losses and leaky-mode losses. A general study of these mechanisms can be found in the literature such as L. G. Cohen et al., "Radiating Leaky-Mode Losses in Single-Mode Lightguides with Depressed-Index Claddings", IEEE Journal of Quantum Electronics, Vol. QE-18, No. 10, October 1982, pp. 1467–72. In this reference the authors describe the propagation of light in more complex lightguides with claddings having a variation in the refractive index also referred to as depressed-clad fibers.

L. G. Cohen et al. teach that varying the cladding profile can improve various quality parameters of the guided modes while simultaneously maintaining low losses. Moreover, they observe that depressed-index claddings produce high losses to the fundamental mode at long wavelengths. Further, they determine that W-profile fibers with high index core, low index inner cladding and intermediate index outer cladding have a certain cutoff wavelength above which fundamental mode losses from the core escalate. These losses do not produce very high attenuation rates and, in fact, the authors study the guiding behavior of the fiber near this cutoff wavelength to suggest ways of reducing losses.

U.S. Pat. Nos. 5,892,615 and 6,118,575 teach the use of W-profile fibers similar to those described by L. G. Cohen, or QC fibers to suppress unwanted frequencies and thus achieve higher output power in a cladding pumped laser. Such fibers naturally leak light at long wavelengths, as discussed above, and are more sensitive to bending than other fibers. In fact, when bent the curvature spoils the W or QC fiber's ability to guide light by total internal reflection. The longer the wavelength, the deeper its evanescent field penetrates out of the core of the fiber, and the more likely the light at that wavelength will be lost from the core of the bent fiber. Hence, bending the fiber cuts off the unpreferred lower frequencies (longer wavelengths), such as the Raman scattered wavelengths, at rates of hundreds of dB per meter.

Unfortunately, the bending of profiled fibers is not a very controllable and reproducible manner of achieving well-defined cutoff losses. To achieve a particular curvature the fiber has to be bent, e.g., by winding it around a spool at just the right radius. Different fibers manufactured at different times exhibit variation in their refractive index profiles as well as core and cladding thicknesses. Therefore, the right radius of curvature for the fibers will differ from fiber to fiber. Hence, this approach to obtaining high attenuation rates is not practical in manufacturing.

In producing an EDFA for the S-band the relatively high losses and low gains over the S-band render the selection of fiber and fiber profile even more difficult. In fact, the problems are so severe that the prior art teaches interposition of external filters between EDFA sections to produce an S-band EDFA. For example, Ishikawa et al. disclose a method of fabricating an S-band EDFA by cascading five stages of silica-based EDFA and four ASE suppressing filters in Ishikawa et al., "Novel 1500 nm-Band EDFA with discrete Raman Amplifier", ECOC-2001, Post Deadline Paper. In Ishikawa et al.'s experimental setup, the length of each EDA is 4.5 meters. The absorption of each suppressing filter at 1.53 μm is about 30 dB and the insertion losses of each suppressing filter at 1.48 μm and 0.98 μm are about 2 dB and 1 dB respectively. The pumping configuration is bi-directional, using a 0.98 μm wavelength to keep a high inversion of more than D≧0.7 (D, relative inversion). The forward and backward pumping powers are the same and the total pumping power is 480 mW. Ishikawa et al. show a maximum gain of 25 dB at 1518.7 nm with 9 dB gain tilt.

This method is relatively complicated and not cost-effective, as it requires five EDFAs, four ASE suppressing filters and high pump power. Also, each of the ASE suppressing filters used in Ishikawa et al.'s method introduces an additional insertion loss of 1–2 dB. The total additional insertion loss is thus about 4–8 dB.

In view of the above, it would be an advance in the art to provide a fiber amplifier exhibiting net gains over the S-band and not requiring external filters and having low pump power requirements. Specifically, it would be an advance to provide an EDFA with distributed ASE suppression in the C-band and L-band or substantially at 1530 nm and longer wavelengths over the whole length of a fiber amplifier. It would be also a welcome advance in the art to provide a method of designing such fiber amplifiers with net gain over the S-band.

OBJECTS AND ADVANTAGES

It is a primary object of the present invention to provide a fiber amplifier that yields losses exceeding any high gains in a long wavelength band and at the same time yields losses substantially smaller than any positive gains in a short wavelength band. In particular, it is an object of the invention to provide an Er-doped fiber amplifier (EDFA) in which the long wavelength band is the C-band and L-band and the short wavelength band is the S-band. More specifically, the EDFA is to provide suppression of amplified spontaneous emission (ASE) near 1525 nm and above and ensure positive gains of at least 15 dB over the S-band.

It is another object of the invention to provide such fiber amplifier in a W-profile (or depressed cladding) fiber and use the fiber's index profile to eliminate the need for external filters and reduce the required pump power by controlling a roll-off loss curve.

Yet another object of the invention is to provide a method for designing fiber amplifiers.

These and numerous other advantages of the present invention will become apparent upon reading the following description.

SUMMARY

The objects and advantages of the invention are achieved by a fiber amplifier designed in a W-profile fiber. The fiber has a core defined by a core cross-section and a refractive index $n_o$. An active material or lasant is doped into the core for amplifying light, e.g., any information-bearing light beam. The fiber also has a depressed cladding surrounding the core and a secondary cladding surrounding the depressed cladding. The depressed cladding has a depressed cladding cross-section and a refractive index $n_1$, and the secondary cladding has a secondary cladding cross-section and a refractive index $n_2$. The fiber amplifier has a pump source for pumping the active material in the core to a level of high relative inversion D; in this state the active material can amplify light. In particular, in fiber amplifiers of the invention the pumping causes the active material to exhibit positive gains in a short wavelength band and high gains in a long wavelength band. The core cross-section, the depressed cladding cross-section and the refractive indices $n_o$, $n_1$, and $n_2$ are selected to obtain a roll-off loss curve about a cutoff wavelength $\lambda_c$. The roll-off loss curve yields losses at least comparable to the high gains in the long wavelength band and losses substantially smaller than the positive gains in the short wavelength band.

In order to obtain the desired roll-off loss curve the refractive index $n_o$ in the core is selected such that an effective index $n_{\it eff}$ experienced by a mode of radiation which is guided, e.g., the fundamental mode at wavelength shorter than the cutoff wavelength, is large. In particular, refractive index $n_o$ is selected such that the slope of the effective index $n_{\it eff}$ experienced by the confined mode is maximized, thereby maximizing a roll-off slope of the roll-off loss curve before the cutoff wavelength $\lambda_c$. Preferably, the refractive index $n_o$ is selected such that the slope of the effective index $n_{\it eff}$ is in the range of 0.002/100 nm to 0.008/1000 nm. In another preferred embodiment, the refractive index $n_o$ of the core is chosen such that the roll-off slope of the roll-off loss curve is greater than or about equal to the maximum slope of the gain spectrum. In this embodiment, it is possible to select a cutoff wavelength such that the distributed loss exceeds the gain for all wavelengths in the long wavelength band, but that the gain exceeds the distributed loss for all wavelengths in the short wavelength band.

Depending on the design of the roll-off loss curve, the cutoff wavelength $\lambda_c$ can be contained in the long wavelength band or in the short wavelength band, or between the short and long wavelength bands.

In the preferred embodiment the fiber amplifier uses Er as the active material, i.e., it is an Er-doped fiber amplifier (EDFA) doped with a concentration of 0.1% wt. of Er. In this case it is further preferred that the short wavelength band is selected to be at least a portion of the S-band and the long wavelength band is selected to be at least a portion of the C-band and/or L-band. Further, it is advantageous to set the cutoff wavelength $\lambda_c$ near 1525 nm in this embodiment. The host material used by the fiber amplifier is preferably a silicate-containing glass such as alumino-germanosilicate glass or phosphorus doped germanosilicate glass.

The pump source providing the pump radiation to invert the population in the Er ions can be any suitable pump source. For example, the pump source is a laser diode emitting pump radiation at about 980 nm. Alternative sources delivering pump radiation at about 980 nm can also be used. It is preferred that pumping is in-core pumping.

It is important that the selection of the cross-sections, i.e., the radii, and the selection of indices of refraction be not performed merely to establish a ratio of radii or refractive indices, but to fix absolute differences between them. Thus, it is preferable that the refractive index $n_o$ of the core differ from the refractive index $n_2$ of the secondary cladding by about 0.005 to about 0.03. Also, the refractive index $n_1$ of the depressed cladding should differ from the refractive index $n_2$ of the secondary cladding by about −0.004 to about −0.02.

The fiber amplifier of the invention can be used in fibers of various cross-sectional profiles. For example, the core-cross section can have the shape of a circle, an ellipse, a polygon or another more complex shape. The same is true for the depressed cladding cross-section. The circular cross-sections can be used if no preferential polarization is to be amplified by the fiber amplifier. The elliptical cross-section can be used when a particular polarization is to be maintained during amplification over an orthogonal polarization.

For proper operation of the fiber amplifier it is important that the pump source provide pump radiation at a sufficient intensity to ensure a high relative inversion D, specifically $D \geq 0.7$. This is especially important in the preferred embodiment where the active material is Er.

Fiber amplifiers designed in accordance with the invention can be used in any situation where high gains are produced in a long wavelength band adjacent a short wavelength band in which the signal to be amplified is contained. In these situations the ASE from the long wavelength band will tend to prevent amplification of signals in the short wavelength band, especially when the positive gains in the short wavelength band are low in comparison to the high gains in the adjacent long wavelength band. The design is particularly useful in EDFAs to amplify signals in the short wavelength S-band. For this purpose the cutoff wavelength $\lambda_c$ is preferably set at 1525 nm and the roll-off loss curve is selected to yield losses of at least 100 dB in the C-band and L-band to suppress ASE from the 1530 nm gain peak. Meanwhile, the roll-off loss curve is also adjusted to yield losses in the S-band which are smaller by at least 5 dB than the positive gains in the S-band to allow for signal amplification. This relationship will ensure at least a 5 dB amplification in the S-band.

In accordance with another embodiment of the invention several fiber amplifiers made according to the method can be used to amplify signals in the short wavelength band, e.g., the S-band. The length L of each of the fiber amplifiers can be varied to obtain the desired amount of gain for separate portions of the S-band.

A detailed description of the invention and the preferred and alternative embodiments is presented below in reference to the attached drawing figures.

DETAILED DESCRIPTION

Figure 1:
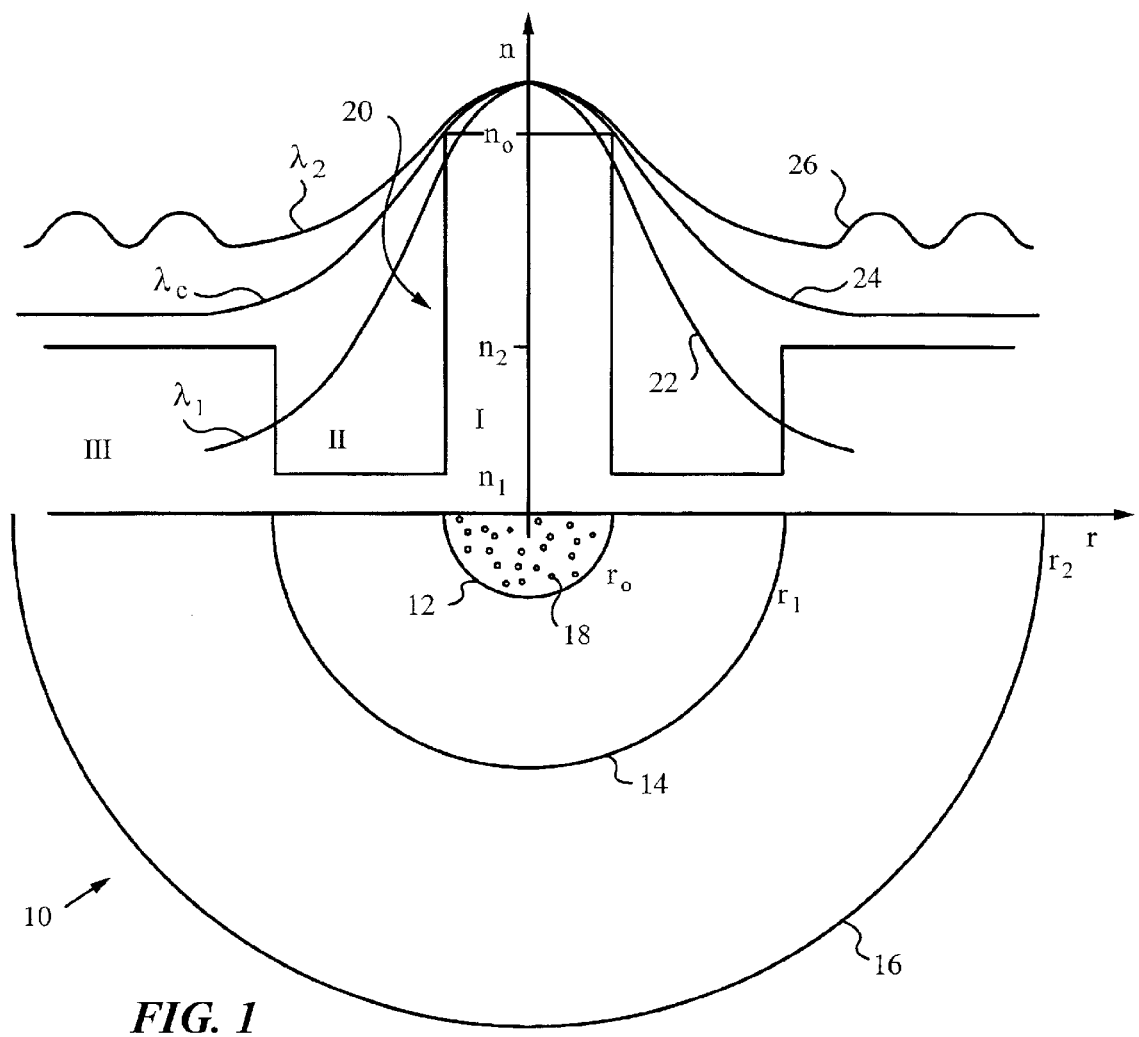
FIG. 1 is a diagram illustrating a W-profile fiber and guided and unguided modes according to the invention.

The instant invention will be best understood by first reviewing the principles of generating a roll-off loss curve in a depressed profile or W-profile fiber 10 as illustrated in FIGS. 1–4. FIG. 1 is a diagram illustrating a portion of a cross-section of a fiber 10 having a core 12 surrounded by a depressed cladding 14. Depressed cladding 14 is surrounded by a secondary cladding 16. Core 12 has a circular cross-section, as do depressed cladding 14 and secondary cladding 16. A region I associated with core 12 extends from $0 \leq r \leq r_o$, depressed cladding 14 and secondary cladding 16 occupy regions II, III extending between $r_o \leq r \leq r_1$ and $r \leq r_1$. Core 12 has an index of refraction $n_o$, depressed cladding 14 has an index of refraction $n_1$ and secondary cladding 16 has an index of refraction $n_2$. The graph positioned above the partial cross-section of fiber 10 illustrates an average index profile 20 defining a W-profile in fiber 10. In the present embodiment fiber 10 is a single mode fiber.

Fiber 10 has an active material 18 doped in core 12. Active material 18 is a lasing medium such as a rare earth ion or any other lasant which exhibits high gains in a long wavelength band and positive gains in a short wavelength band. Specifically, when pumped to a high relative inversion D, the high gains of active material 18 in the long wavelength band cause amplified spontaneous emissions (ASE) or lasing which reduces the population inversion of lasant 18 and thus reduces the positive gains in the short wavelength band, making it impossible to effectively amplify signals in the short wavelength band.

Figure 2:
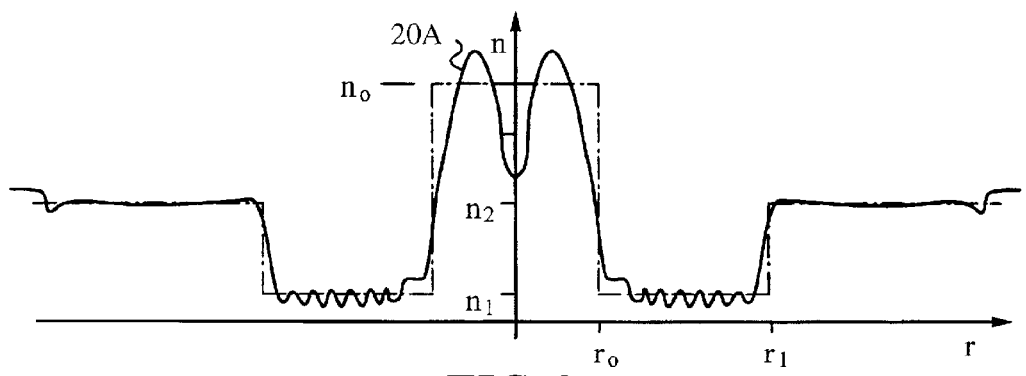
FIG. 2 is a graph illustrating a typical index profile in the fiber of FIG. 1.

FIG. 2 illustrates a W-profile 20A as is obtained with normal manufacturing techniques. For the purposes of the invention it is sufficient that the radially varying index of core 12 have an average value equal to $n_o$. Likewise, it is sufficient that indices of depressed cladding 14 and secondary cladding 16 average out to the values $n_1$ and $n_2$. The average index $n_o$ of core 12 is significantly higher than index $n_1$ of depressed cladding 14 and index $n_2$ of secondary cladding 16. The selection of appropriate values of indices $n_o$, $n_1$, $n_2$ and radii $r_o$, $r_1$, $r_2$ is made to achieve certain guiding properties of fiber 10, as required by the instant invention. Specifically, profile 20 is engineered to have a fundamental mode cutoff wavelength $\lambda_c$ such that light in the fundamental mode at wavelengths smaller than $\lambda_c$ is retained in core 12 while light in fundamental mode at wavelength $\lambda_c$ or longer wavelengths is lost to secondary cladding 16 over a short distance. This objective is accomplished by appropriately engineering W-profile 20A.

Fundamental mode cutoff wavelength $\lambda_c$ of fiber 10 is a wavelength at which the fundamental mode (the $LP_{01}$ mode) transitions from low-losses to high losses in core 12, i.e., is cut off from core 12. First, the fundamental mode cutoff wavelength $\lambda_c$ for fiber 10 is set in accordance to selection rules for cross-sections and refractive indices $n_o$, $n_1$ and $n_2$ of fiber 10 as derived from Maxwell's equations. In the weak guiding approximation (which is valid when the indices of refraction of core 12 and claddings 14, 16 are all relatively close to each other), the Maxwell vector equations can be replaced with a scalar equation. The scalar $\psi$ represents the strength of the transverse electric field in the fiber. For more information, see for example G. Agrawal, "Nonlinear Fiber Optics" (Academic, San Diego, 1995), D. Marcuse, "Light Transmission Optics" (Van Nostrand, Princeton, 1972), and D. Marcuse, "Theory of Dielectric Optical Waveguides" (Academic, New York, 1974).

For convenience, let us define the following parameters:

$$u_0 = \sqrt{n_0^2 - n_2^2} \quad \text{and} \quad u_1 = \sqrt{n_2^2 - n_1^2} \tag{1}$$

The scalar field $\psi$ inside fiber 10 satisfies a wave equation whose solutions are Bessel functions and modified Bessel functions. For the fundamental mode supported by fiber 10, inside core 12 is thus:

$$\psi = J_0(\kappa r), \ 0 \leq r \leq r_0 \text{ (region I)} \tag{2}$$

where $\kappa$ is an eigenvalue that needs to be determined, and $J_0$ is the zeroth Bessel's function.

Inside depressed cladding 14, the scalar field $\psi$ is:

$$\psi = AK_0(\beta r) + BI_0(\beta r), \ r_0 \leq r \leq r_1 \text{ (region II)} \tag{3}$$

where A and B are constants to be determined, $\beta^2 = (u_0^2 + u_1^2)(2\pi/\lambda)^2 - \kappa^2$, and $K_0$ and $I_0$ are the modified Bessel's functions. Here $\lambda$ is the vacuum wavelength of the light.

In secondary cladding 16, we obtain:

$$\psi = CK_0(\gamma r), \ r \geq r_1 \text{ (region III)} \tag{4}$$

Here C is another constant, and $\gamma^2 = u_0^2(2\pi/\lambda)^2 - \kappa^2$. A, B, C, and $\kappa$ are found using the boundary conditions, which require that $\psi$ and its first derivative are both continuous at $r_0$ and $r_1$.

It can be shown that fundamental mode cutoff wavelength $\lambda_c$ is a wavelength $\lambda$ at which $\gamma=0$. (See for example, Cohen et al., IEEE J. Quant. Electron. QE-18 (1982) 1467–1472.)

For additional convenience, let us define the following parameters:

$$x = \frac{2\pi u_0 r_0}{\lambda_c}, \quad \rho = u_1/u_0, \quad s = r_1/r_0. \tag{5}$$

Now, fundamental mode cutoff wavelength $\lambda_c$ can be determined if parameter x is determined. That determination can be made with the aid of algebra known to a person skilled in the art, since parameter x is the root of the following equation:

$$\rho J_0(x) K_1(\rho x) I_1(\rho s x) - \rho J_0(x) I_1(\rho x) K_1(\rho s x) - J_1(x) K_1(\rho s x) I_0(\rho x) - J_1(x) I_1(\rho s x) K_0(\rho x) = 0. \tag{6}$$

Three observations should be made regarding the parameter x. First, x does not exist for all values of s and $\rho$. For example, for $\rho=1$ and $s \leq \sqrt{2}$, there is no x that satisfies Eq. (6). This means that all wavelengths are guided in core 12 in this regime. The criterion that Eq. (6) have a solution is:

$$s^2 \geq 1 + 1/\rho^2. \tag{7}$$

Second, for practical applications x cannot be too small. This is because, according to Eq. (5), the parameter x is proportional to radius $r_0$ of core 12, and the radius has to be large enough that it is easy to couple light into and out of core 12. (A smaller core 12 also makes the nonlinear effects stronger, which is often a disadvantage.) Therefore, since $x = 2\pi u_0 r_0 / \lambda_c$, preferably $x \geq 1$. This implies that $\rho \geq 0.224$ or, in terms of the refractive indices:

$$\sqrt{(n_2^2 - n_1^2)/(n_0^2 - n_2^2)} \geq 0.224.$$

Third, for larger values of s, the value of x only weakly depends on s. Thus it is advantageous to have a fiber in this region of parameter space, since a manufacturing flaw producing an error in s will have a small effect on the value of fundamental mode cutoff wavelength $\lambda_c$. Therefore, it is convenient to use the rule $s \leq 1 + 1/\rho$, or in terms of the refractive indices:

$$\frac{r_1}{r_0} \geq 1 + \sqrt{(n_0^2 - n_2^2)/(n_2^2 - n_1^2)}. \tag{8}$$

The selection of cross sections and refractive indices of core 12, depressed cladding 14 and outer cladding 16 is guided by the above rules in setting the appropriate fundamental mode cutoff wavelength $\lambda_c$. First, $\lambda_c$ can be pre-selected, e.g. a wavelength close to 1530 nm, and then convenient values are selected for $u_o$ and $r_o$. Based on these choices x is computed from equation 5, and conveniently $x \leq 1$ (otherwise the previous choices can be adjusted). Then, suitable values of s and $\rho$ are found using equation 6. A range of values for $\rho$ and s will yield desired $\lambda_c$. Typically, all values of $\rho$ are larger than 0.224. In addition, the rule of equation 8 is used to further narrow the range of suitable values of $\rho$ and s.

Finally, the values of s and $\rho$ have an additional limitation. Namely, they must be selected so that core 12 of fiber 10 has a great enough loss, e.g., 5 dB/m or even 100 dB/m or more at a wavelength $\lambda > \lambda_c$. To find the loss at wavelength $\lambda > \lambda_c$, the fiber modes for light having wavelength $\lambda > \lambda_c$ are required.

Equations (2), (3), and (4) specify the fundamental mode when $\lambda < \lambda_c$. When $\lambda < \lambda_c$, the function $\psi$ is oscillatory, rather than exponentially decaying, in secondary cladding 16. Therefore when $\lambda < \lambda_c$, Eq. (4) is replaced by:

$$\psi = CJ_0(qr) + DN_0(qr), \ r \geq r_1 \text{ (region III)} \tag{9}$$

where $N_0$ (also called $Y_0$) is the zeroth Neumann function, $q^2 = \kappa^2 - u_0^2(2\pi/\lambda)^2$, and C and D are constants to be determined.

There are two key items to note regarding the modes for $\lambda > \lambda_c$. First, there are five unknowns (A, B, C, D, and $\kappa$) and four boundary conditions (continuity of $\psi$ and $d\psi/dr$ at $r_0$ and $r_1$). The equations are underconstrained: $\kappa$ may be chosen to be any value between 0 and $$(2\pi/\lambda)\sqrt{u_0^2 + u_1^2}.$$

Thus, there is a continuum of states for each $\lambda > \lambda_c$, corresponding to the continuum of values that $\kappa$ may have. This situation is quite different from the case $\lambda < \lambda_c$, where four unknowns (A, B, C, and $\kappa$) are fixed by the four boundary conditions, resulting in $\kappa$ being a discrete eigenvalue having a unique value at each $\lambda < \lambda_c$.

Second, the modes specified by Eqs. (2), (3), and (9) are eigenmodes of the fiber, e.g. a W-fiber; however, these modes do not correspond to the situation that is physically realized. This is a result of Eq. (9) containing both incoming and outgoing waves, whereas in practice only outgoing waves are present (the light at wavelength $\lambda > \lambda_c$ originally propagating in core 12 radiates out).

Nevertheless, the modes of Eqs. (2), (3), and (9) can be used to estimate the losses at wavelengths greater than $\lambda_c$.

First, for a given wavelength $\lambda$, find the value of $\kappa$ K that minimizes $C^2+D^2$. This corresponds to the mode that is the most long-lived within the core. (An analogy can be made between the wave equation for the scalar $\psi$ in the fiber and the quantum mechanical wave equation for a particle in a potential well. Then the quantum mechanical results can be borrowed. See for example David Bohm, "Quantum Theory", Dover 1989, Chapter 12 §14–22.)

Second, once $\kappa$ is found in the above manner, the outgoing waves can be computed from Eq. (9). These outgoing waves give a reasonable estimation of the loss from core 12 into secondary cladding 18, even when no incoming waves are present. These outgoing waves will cause beam at wavelength $\lambda > \lambda_c$ propagating in core 12 to be attenuated along the length of the fiber. If the beam has power P, then the change in power P with distance z along fiber 10 is described by the equation:

$$\frac{dP}{dz} = -\Lambda P. \qquad (10)$$

The loss is given by the coefficient $\Lambda$, which is approximately:

$$\Lambda = \frac{\lambda}{4\pi^2 n_0} \frac{C^2+D^2}{\int_0^{r_0} r\, dr \psi^* \psi}. \qquad (11)$$

The loss $\Lambda$, having units of m$^{-1}$, can be converted to a loss $\beta$ in units dB/m, using the relation:

$$\beta = 10 \log_{10}(e) \cdot \Lambda. \qquad (12)$$

Here the term "loss" refers to radiation that leaks out of core 12 into secondary cladding 16. In fact, the radiation may not be truly lost from fiber 10 itself, if it remains in secondary cladding 16. In some cases this will be sufficient. In other cases light from secondary cladding 16 can be out-coupled, as necessary.

Another method for calculating the losses involves calculating the complex propagation constant of the leaky fundamental mode of fiber 10. Leaky modes are discussed in, for example, D. Marcuse, "Theory of Dielectric Optical Waveguides" (Academic, New York, 1974) Chapter 1. The loss is related to the imaginary part of the complex propagation constant of the leaky mode. The complex propagation constant, or its equivalent that is the complex effective index of refraction, may be computed using commercially available software, such as that obtainable from Optiwave Corporation of Nepean, ON, Canada.

In some cases it may be preferable to numerically solve for the modes of a given fiber rather than use the Bessel function approach outlined above, since real fibers do not have the idealized step index profile indicated by profile 20 shown in FIG. 1, but have variations from the ideal as shown by graph 20A in FIG. 2 of the actual refractive index profile obtained in practice. In particular, the most common method of single-mode fiber manufacture today involves the MOCVD process, which typically leaves an index dip in the center of core 12. Numerical solutions can, more easily than the method described above, take into account the actual variations in refractive index as a function of radius. Such numerical calculations can again give fundamental mode cutoff wavelength $\lambda_c$ and fiber losses as a function of fiber parameters including cross-sections and refractive indices, allowing fiber 10 to be designed to exhibit the desired features.

When Eq. (11) is used to estimate the loss, refractive indices $n_0$, $n_1$, and $n_2$ will in general be average indices of refraction of profile 20, since the actual indices of refraction will vary somewhat as a function of radius (see profile 20A). Also, the index of refraction n is not necessarily radially symmetric. If the cross section of fiber 10 is described by polar coordinates r and $\theta$ the refractive index may depend upon the angle $\theta$ as well as the radius r. Thus, $n = n(r,\theta)$. Such an asymmetric fiber may be desirable for polarization maintenance, for example.

Here is the prerequisite for the fiber to have fundamental mode cutoff wavelength $\lambda_c$. Let R be a radius large enough that the index at radius R has substantially leveled off to the value $n_2$. Then fiber 10 will have fundamental mode cutoff wavelength $\lambda_c$ if (see B. Simon, Ann. Phys. 97 (1976), pp. 279):

$$\int_0^{2\pi} d\theta \int_0^R r\, dr(n^2(r,\theta) - n_2^2) \le 0. \qquad (13)$$

Note that given the profile of FIG. 1, Eq. (13) becomes:

$$\pi r_0^2 u_0^2 - \pi(r_1^2 - r_0^2)u_1^2 \le 0, \qquad (14)$$

which is equivalent to Eq. (7) above.

Fundamental mode cutoff wavelength $\lambda_c$ is the largest wavelength for which there is an eigenmode that is localized in region I. The losses for wavelengths above cutoff wavelength $\lambda_c$ can be determined, for example, by (i) solving for the modes that are not localized but include incoming and outgoing waves, (ii) for each wavelength finding the mode with the smallest outgoing intensity, and (iii) using this outgoing intensity to estimate the loss. As discussed above, other methods are also available to a person skilled in the art for calculating losses. In general, fiber 10 with a desired fundamental mode cutoff wavelength $\lambda_c$ and losses can therefore be designed by adjusting the profile $n(r,\theta)$, which is equivalent to adjusting the cross-sections and refractive indices of core 12, depressed cladding 14 and secondary cladding 16.

The rules presented above will enable a person skilled in the art can to set fundamental mode cutoff wavelength $\lambda_c$ by making a selection of $r_o$, $r_1$, $n_o$, $n_1$ and $n_2$. This selection of $r_o$, $r_1$, $n_o$, $n_1$, and $n_2$ provide distributed ASE suppression over the length of the fiber 10 and result in a family of loss curves with different roll-offs (with respect to wavelength). Therefore, additional constraints have to be placed on the selection of $r_o$, $r_1$, $n_o$, $n_1$, and $n_2$ to achieve the objectives of the present invention, as discussed below.

Referring back to FIG. 1, superposed on average index profile 20 is an intensity distribution of a guided fundamental mode 22 at a first wavelength $\lambda_1 < \lambda_c$. First wavelength $\lambda_1$ is contained within a short wavelength band. A fundamental mode 24 which is no longer guided by fiber 10 is also superposed on index profile 20. Mode 24 is at cutoff wavelength $\lambda_c$. An intensity distribution of another mode 26 which is not guided by fiber 10 and exhibits an oscillating intensity distribution beyond core 12 and depressed cladding 14 is also shown. Radiation in mode 26 has a second wavelength $\lambda_2$, which is longer than cutoff wavelength $\lambda_c < \lambda_2$ and is contained in a long wavelength band.

Figure 3:
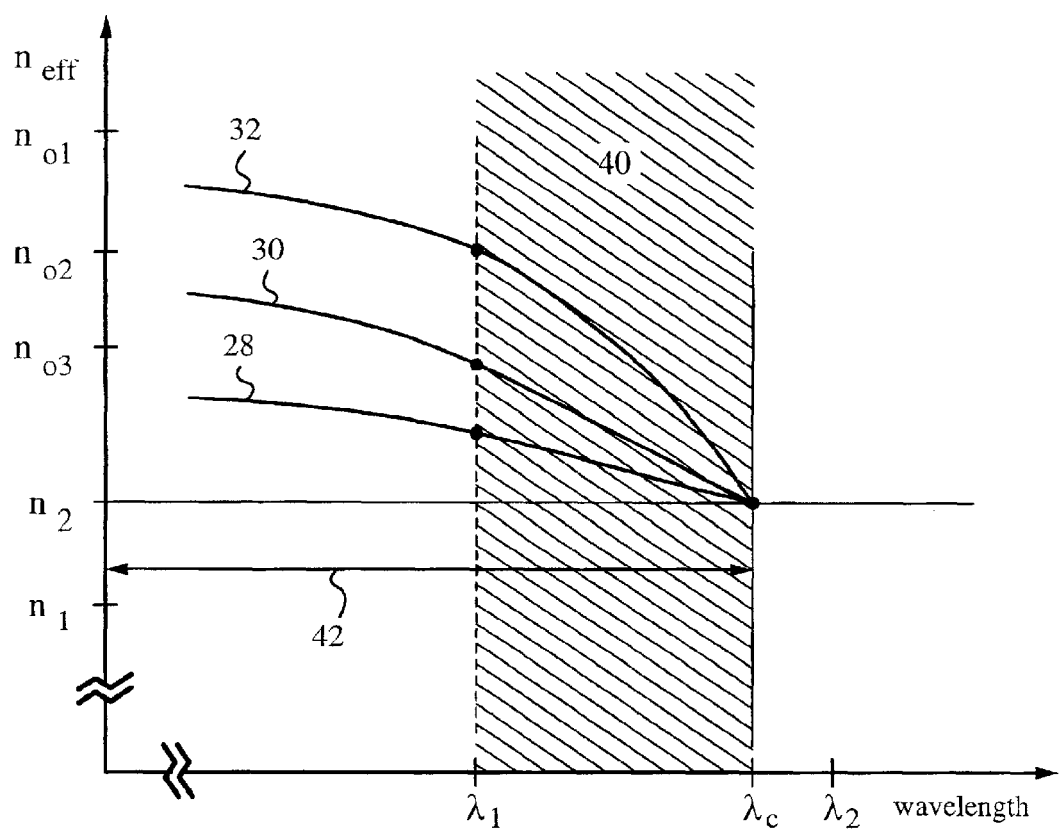
FIG. 3 is a graph illustrating the selection of appropriate core index $n_o$ to ensure that the effective index experienced by a guided mode in the short wavelength band of interest is maximized.

The graphs in FIG. 3 are plots of wavelength versus an effective index $n_{\it eff}$ experienced by guided mode 22 whose wavelength $\lambda_1$ is contained within a short wavelength band 42 and of non-guided mode 24 at cutoff wavelength $\lambda_c$ for three choices of the value of index $n_o$ of core 12. Specifically, at a lowest value of index $n_{o1}$ of core 12, the effective index $n_{eff}$ experienced by mode 22 is described by graph 28. Graph 28 illustrates a relatively low value of effective index $n_{eff}$ over short wavelength band 42, i.e., over the entire range of wavelengths $\lambda_1$ at which mode 22 is guided. In addition, the value of $n_{eff}$ remains very low in a region of interest 40 below cutoff wavelength $\lambda_c$. The choice of an intermediate value of index $n_{o2}$ of core 12 produces graph 30. In this graph $n_{eff}$ is higher than in graph 28 over the entire short wavelength band 42. Still, the value of $n_{eff}$ is low in region of interest 40. A choice of a large value of index $n_{o3}$ produces graph 32, which increases $n_{eff}$ experienced by mode 22 over entire short wavelength band 42 including region of interest 40. Given such large value of refractive index $n_{o3}$ effective index $n_{eff}$ exhibits a large negative slope right before cutoff wavelength $\lambda_c$ in region of interest 40. Preferably, the value of refractive index $n_{o3}$ is large enough such that this roll-off slope is in the range of 0.002/1000 nm to 0.008/1000 nm. In a preferred embodiment, the refractive index $n_o$ of the core is at least 0.5% larger than the refractive index $n_2$ of the secondary cladding. Of course, a person skilled in the art will realize that index $n_o$ of core 12 can not be made arbitrarily large to continue increasing the negative slope of $n_{eff}$ before $\lambda_c$ due to material constraints.

Figure 4:
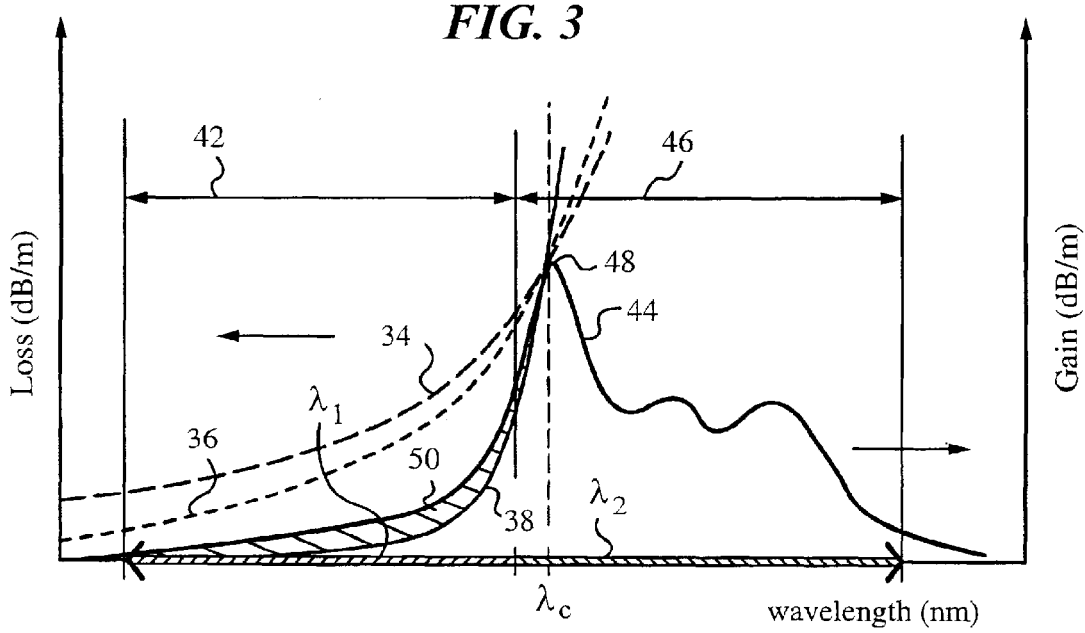
FIG. 4 is a graph illustrating appropriate selection of the core index to obtain a suitable roll-off loss curve in an Er-doped fiber amplifier (EDFA) in accordance with the invention.

FIG. 4 illustrates a gain profile 44 of active material 18 when pumped to a high relative inversion D. Short wavelength band is designated by reference 42, as in FIG. 3, and long wavelength band is designated by reference 46. Gain profile 44 exhibits high gains in long wavelength band 46 and positive gains in short wavelength band 42. In particular, high gains in long wavelength band 46 include a peak 48 very close to short wavelength band 42.

In this embodiment the cross-sections or radii of core 12, depressed cladding 14 and refractive indices $n_o$, $n_1$, and $n_2$ are selected to place cutoff wavelength $\lambda_c$ right at peak 48. Additionally, the value of index $n_o$ of core 12 is selected to obtain a roll-off loss curve 38 about cutoff wavelength $\lambda_c$ set at peak 48 of high gains in long wavelength band 46. More particularly, roll-off loss curve 38 is selected to yield losses at least comparable to the high gains in long wavelength band 46 while yielding losses substantially smaller than the positive gains in short wavelength band 42. Roll-off loss curve 38 drops below the positive gains indicated by profile 44 because of its rapid decrease or large positive slope to the left for wavelengths below cutoff wavelength $\lambda_c$. The gains thus exceed losses across entire short wavelength band 42, as better visualized by hatched area 50. Preferably, roll-off loss curve 38 is such that the gains exceed the losses in short wavelength band 42 by at least 5 dB.

Curve 38 is obtained when $n_{eff}$ experienced by guided mode 22 is high and the slope of $n_{eff}$ just below $\lambda_c$ has a large negative slope. In other words, curve 38 is obtained by selecting index $n_{o3}$ for core 12. Roll-off loss curves obtained with lower indices $n_{o2}$ and $n_{o1}$ in core 12 are indicated by references 36 and 34 respectively. Because $n_{eff}$ and its slope below $\lambda_c$ experienced by mode 22 can not be maximized by choosing indices lower than $n_{o3}$, the roll-off slope is smaller for curves 36 and 34 and thus the losses they introduce in short wavelength band 42 remain above the positive gains. As long as losses exceed gains no useful amplification can be produced by active material 18 in short wavelength band 42.

The W-profile fiber designed in accordance with the above rules w finds its preferred embodiment when active material 18 is Er and the short wavelength band is the S-band or a select portion of the S-band while the long wavelength band covers the C-band and/or the L-band or a select portion or portions of these two bands. Preferably, the host material of fiber 10 is silicate-containing glass such as alumino-germanosilicate glass or phosphorus doped germanosilicate glass.

Figure 5:
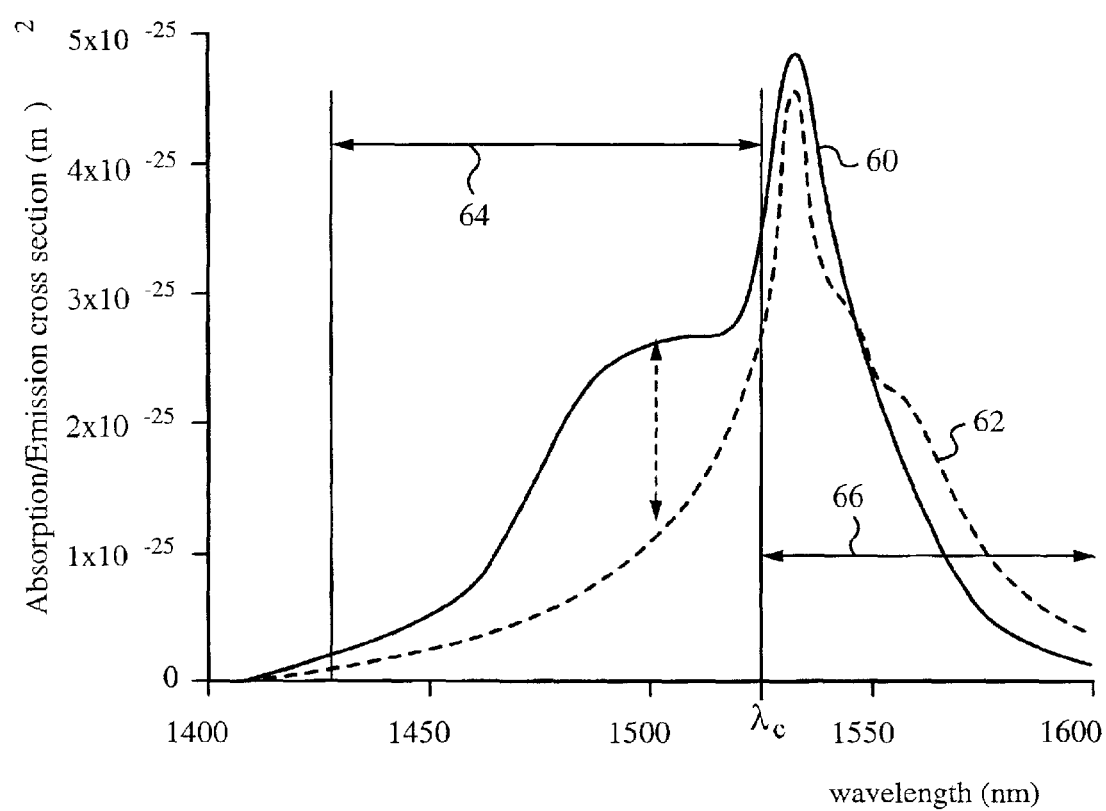
FIG. 5 is a graph of the absorption and gain cross sections of Er ions in alumino-germanosilicate glass.

FIG. 5 shows the wavelength dependent absorption cross-section 60 and wavelength dependent emission cross section 62 of Er-doped alumino-germanosilicate glass. Other Er-doped glasses have qualitatively similar gain (emission) and absorption spectra. Note that the gain extends to wavelengths shorter than 1450 nm, but the absorption cross section is much greater than the emission cross section for all wavelengths with a short wavelength band 64, in this case the S-band extending from about 1425 nm to about 1525 nm. Specifically, absorption cross section is much above emission cross section near 1500 nm. This indicates that high levels of relative population inversion D is required for Er to yield substantial net gain in S-band 64. A long wavelength band 66, in this case the C-band and the L-band extend from 1525 nm to 1600 nm and beyond. The C- and L-bands exhibit high gains, especially in the C-band at a peak wavelength of about 1530 nm. The choice of alumino-germanosilicate glass or phosphorus doped germanosilicate glass is preferred because when Er is doped into these host materials the emission cross section is increased in comparison to standard glass fiber. Other glass compositions which boost the emission cross section in S-band 64 relative to emission cross section 62 at the emission peak near 1530 nm can also be used.

Figure 6:
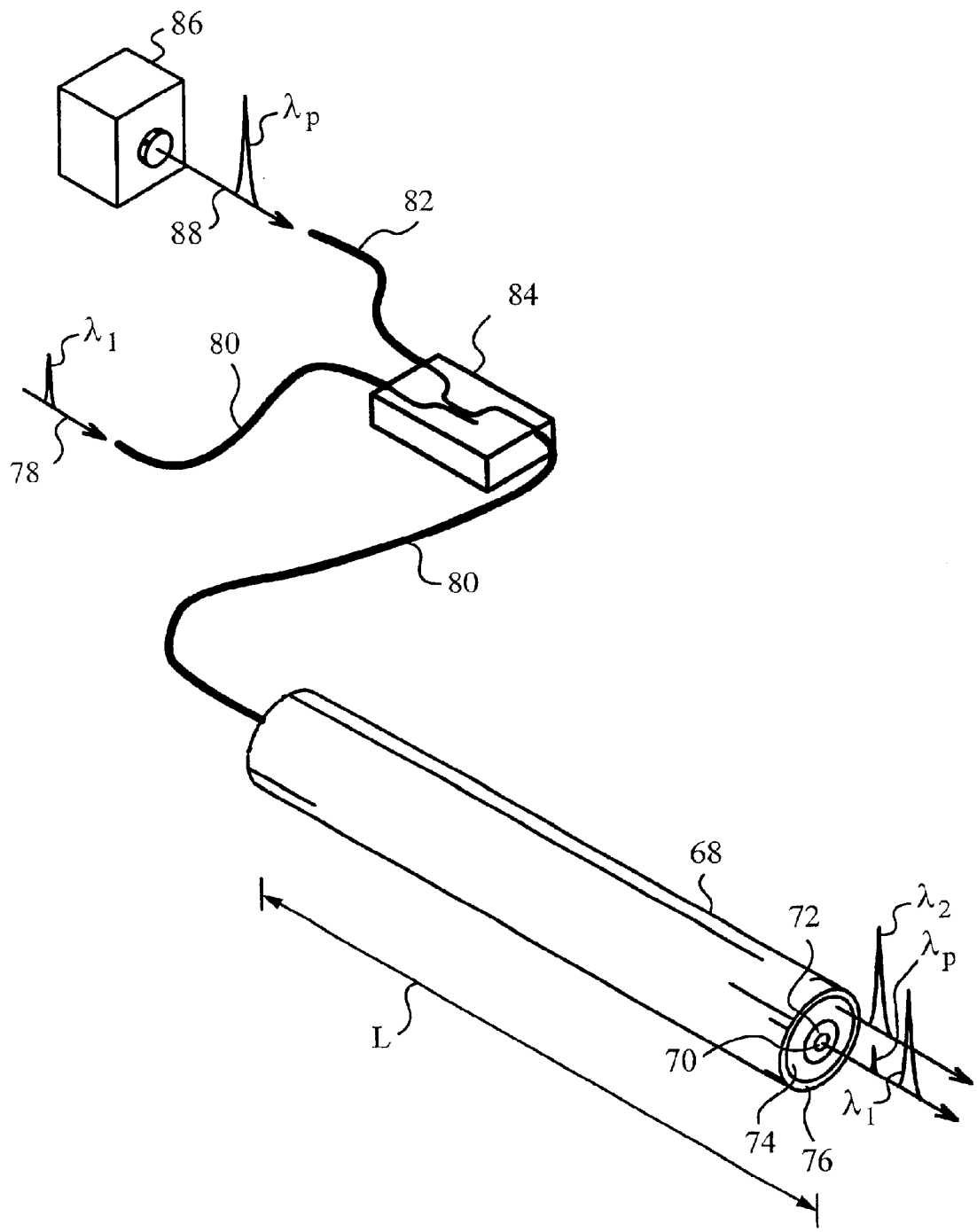
FIG. 6 is an isometric view of an EDFA operated in accordance with the invention.

FIG. 6 shows an Er-doped fiber amplifier 68 (EDFA) using alumino-germanosilicate glass as the host material. EDFA 68 is doped with a concentration of 0.1% wt. of Er in a core 70 of index $n_o$. Core 70 is surrounded by a depressed cladding 72 of index $n_1$, and a secondary cladding 74 of index $n_2$. EDFA 68 has a protective jacket 76 surrounding secondary cladding 74 to offer mechanical stability and to protect EDFA 68 against external influences.

A signal radiation 78 at a first wavelength $\lambda_1$ contained within S-band 64 is delivered to EDFA 68 for amplification from a fiber 80. For example, signal radiation 78 can be an information-bearing signal requiring amplification.

Fiber 80 is coupled with a fiber 82 in a wavelength combiner 84. Fiber 82 is used to couple a pump radiation 88 from a pump source 86 to EDFA 68. Pump source 86, preferably a laser diode, provides pump radiation 88 at a pump wavelength $\lambda_p$ of about 930 nm for pumping the Er ions in core 70 to achieve a high level of relative population inversion D. Parameter D varies from D=−1 indicating no population inversion to D=1 signifying complete population inversion. When D=0, exactly half of the Er ions are in the excited energy state or manifold of states, while half remain in the ground energy manifold. In this case, EDFA 68 is approximately transparent (for wavelengths near the 3-level transition at 1530 nm). For non-uniformly inverted EDEAs, parameter D is considered as the average value of inversion. In the present embodiment, the intensity of pump radiation 88 is determined such that it ensures a relative inversion of D≧0.7 in the Er ions.

Pump radiation 88 and signal radiation 78 are combined in combiner 84 and both delivered to EDFA 68 by fiber 80. More particularly, both signal and pump radiation 78, 88 are coupled into core 70 from fiber 80.

Core 70 and claddings 72, 74 all have circular cross sections in this embodiment. The cross sections and indices $n_o$, $n_1$, $n_2$ are selected in accordance with the method of the invention to set the cutoff wavelength $\lambda_c$ near 1525 nm (see FIG. 5). In other words, the cutoff wavelength $\lambda_c$ is selected to be between short wavelength band 64 or the S-band and the long wavelength band 66 or the C-band and L-band.

It is important that index $n_o$ of core 70 be chosen to provide for a large negative slope in effective index $n_{eff}$, preferably about 0.008/1,000 nm, near cutoff wavelength $\lambda_c$. As a result, the roll-off loss curve exhibits a rapid decrease for wavelengths below cutoff wavelength $\lambda_c$ ensuring that the losses in S-band 64 are lower than the positive gains. The losses produced by this roll-off loss curve increase rapidly for wavelengths larger than cutoff wavelength $\lambda_c$. Thus, the losses produced in the C- and L-bands 66 are at least comparable to the high gains.

Designing EDFA 68 in accordance with the invention will ensure that signal radiation 78 at $\lambda_1$ is amplified while ASE at any wavelength $\lambda_2$ in the C- and L-bands 66, and especially at $\lambda_2$=1530 nm is rejected into cladding 74 as shown. Positive gains in S-band 64 will typically be on the order of 25 dB above the losses and thus, to obtain sufficient amplification of signal radiation 78, EDFA 68 requires a certain length L. The smaller the difference between the positive gains and losses in the S-band 64, the longer length L has to be to provide for sufficient amplification of signal radiation 78. In the present embodiment L is about 6 meters.

Figure 7:
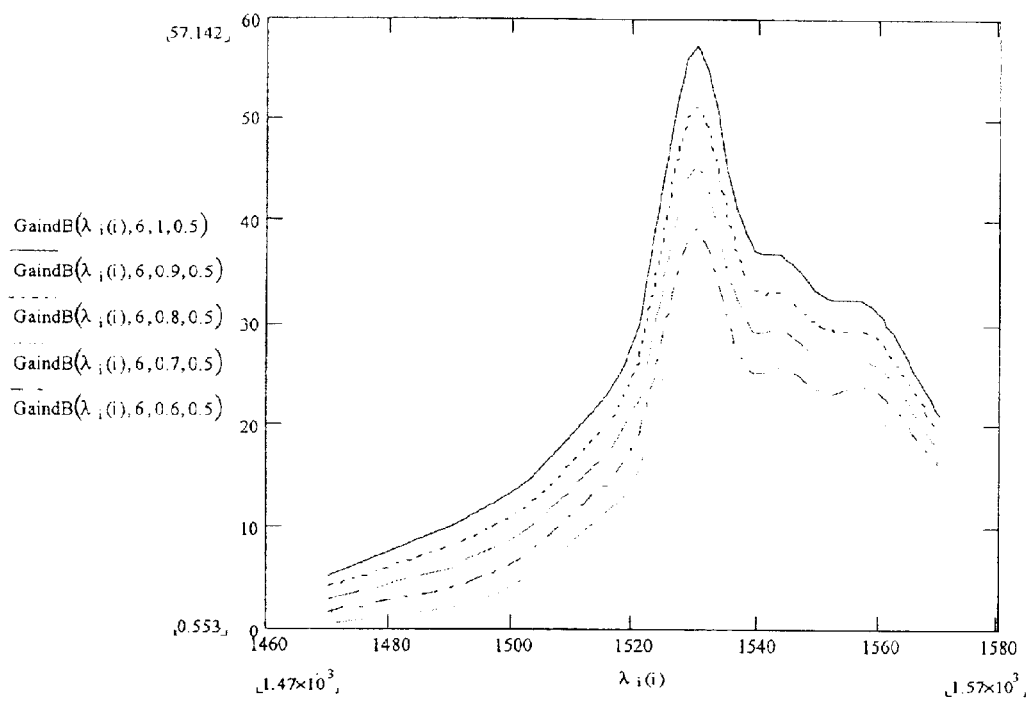
FIG. 7 are graphs of net gain in a 6 meter long aluminogermanosilicate EDFA doped at 0.1% wt. with a mode overlap factor $\Gamma=0.5$ at various inversion values D.

FIG. 7 shows the net gain (gain minus absorption) of EDFA 68 for L=6 meters and with a typical mode-overlap factor, $\Gamma$=0.5 without the benefit of the roll-off loss curve. The family of curves represent various levels of inversion, from D=0.6 through D=1. Note that as the level of inversion is increased, the net gain increases for all wavelengths. For full inversion (D=1), the S-band 64 net gain ranges from 5–25 dB over 1470–1520 nm, the C-band 66 net gain exceeds 30 dB, and the 1530 nm gain peak exhibits over 55 dB of net gain. This condition is, in practice, very difficult to achieve because lasing at 1530 nm, and/or significant amplified spontaneous emission (ASE) would occur at significantly lower values of net gain (about 45 dB or lower), thereby limiting the achievable level of inversion. The middle curve (D=0.8, with 90% of Er ions in the excited energy manifold) corresponds approximately to this ASE-limited situation, with about 25 dB of net gain within the C-band 66 and only about 10 dB of net gain within the S-band 64.

In prior art EDFAs this situation gets worse (for the S-band) when a C-band EDFA is optimized for efficiency (dB gain per unit pump power). This optimization results in somewhat longer (or more highly doped) fibers which become ASE-limited (45 dB net gain at 1530 nm) with lower levels of inversion. In summary, most EDFAs in use today operate with incomplete inversion because of 1530 nm-ASE combined with the requirement for good overall efficiency.

Figure 8:
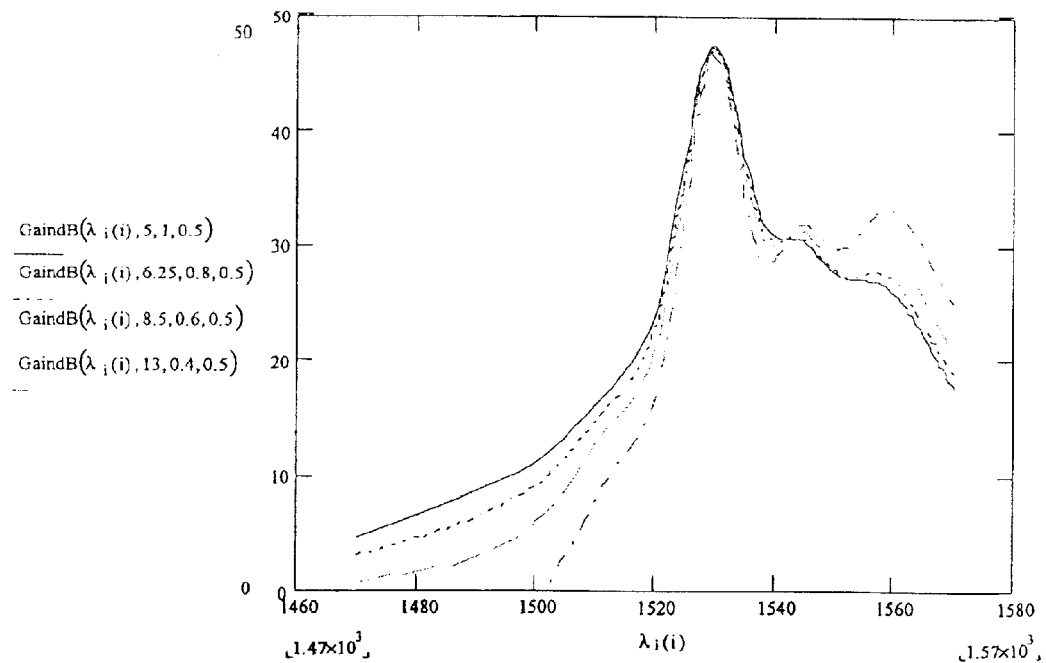
FIG. 8 are graphs of net gain spectra in an aluminogermanosilicate EDFA at inversion values between $D=0.4$ and $D=1$ for fiber lengths between 5 meters and 13 meters chosen to maintain 45 dB gain at 1530 nm.

The relationship between the level of inversion, D, and the net gain in the S-band 64 relative to the net gain in the C-band 66 is shown in FIG. 8. A family of curves representing the net gain spectra for EDFA 68 without the benefit of the roll-off loss curve at inversion levels between D=0.4 and D=1, and L between 5 meters and 13 meters is shown. Lengths L were chosen in order to maintain 45 dB of net gain at 1530 nm, as this situation corresponds approximately to the onset of ASE. Note that the higher levels of inversion D favor gain in S-band 64, while more moderate (D=0.4–0.6) levels of inversion result in minimal gain-slope within the C-band 66. In other words, an EDFA designed for use within the S-band 64 should have nearly complete inversion, unlike an EDFA optimized for use within the C-band 66. For this reason, in the preferred embodiment the invention is maintained in the range $D \geq 0.7$.

Figure 9:
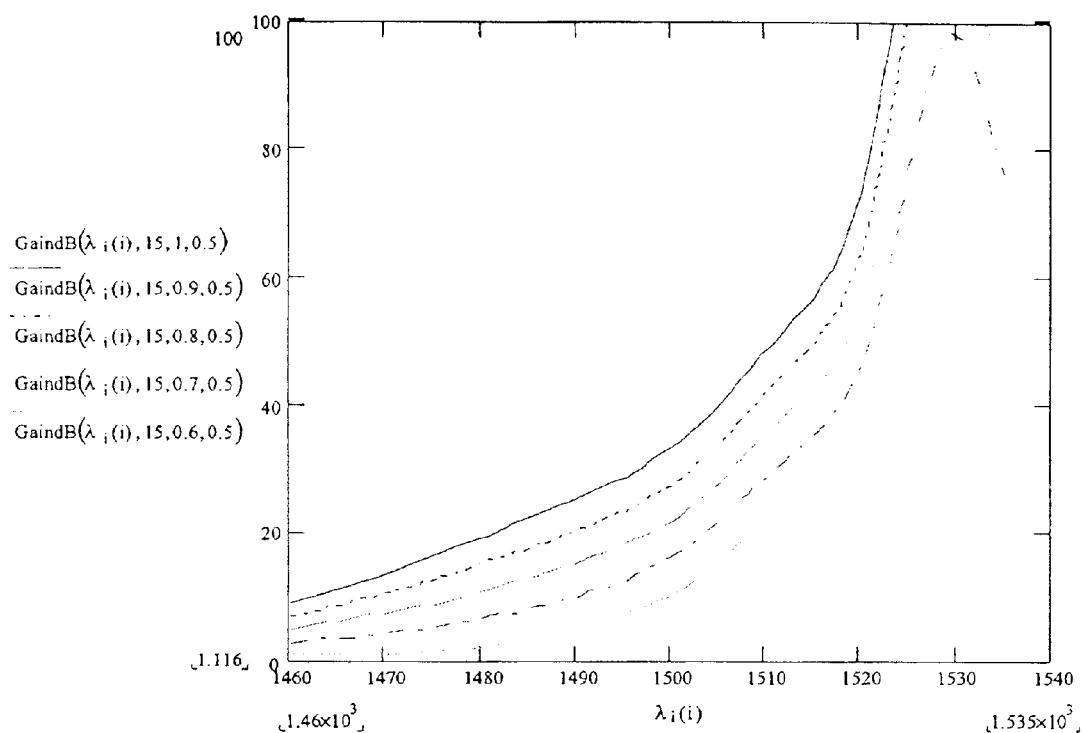
FIG. 9 are graphs of gain spectra for a 15 meter long alumino-germanosilicate EDFA, at inversion values between $D=0.6$ and $D=1$.

Referring still to FIG. 8, one observes that the gain in S-band 64 can not exceed ~5 dB at 1470 nm and ~20 dB at 1520 nm if the 1530 nm gain is limited to 45 dB. To achieve higher gain the length L of EDFA 68 has to be increased, while maintaining a high level of inversion would to produce larger gain in S-band 64. FIG. 9 shows the net gain spectra for EDFA 68 at inversion levels between D=0.6 and D=1, when length L is increased to 15 meters. While gain in S-band 64 exceeds 20 dB for a bandwidth exceeding 30 nm, the 1530 nm gain is in excess of >100 dB for D>0.7. Now, with the aid of the roll-off loss curve engineered in EDFA 68 in accordance with the invention, the losses at 1530 nm can be comparable or larger than this gain, thus preventing ASE or lasing.

Figure 10:
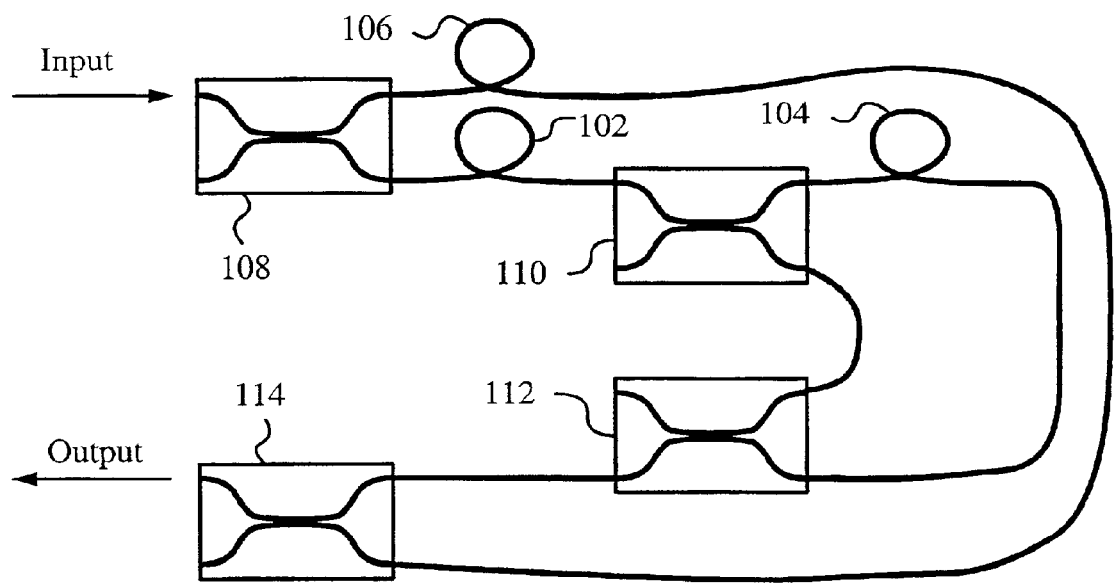
FIG. 10 is a diagram illustrating the use of three EDFA amplifiers to amplify three portions of the S-band.
Figure 11:
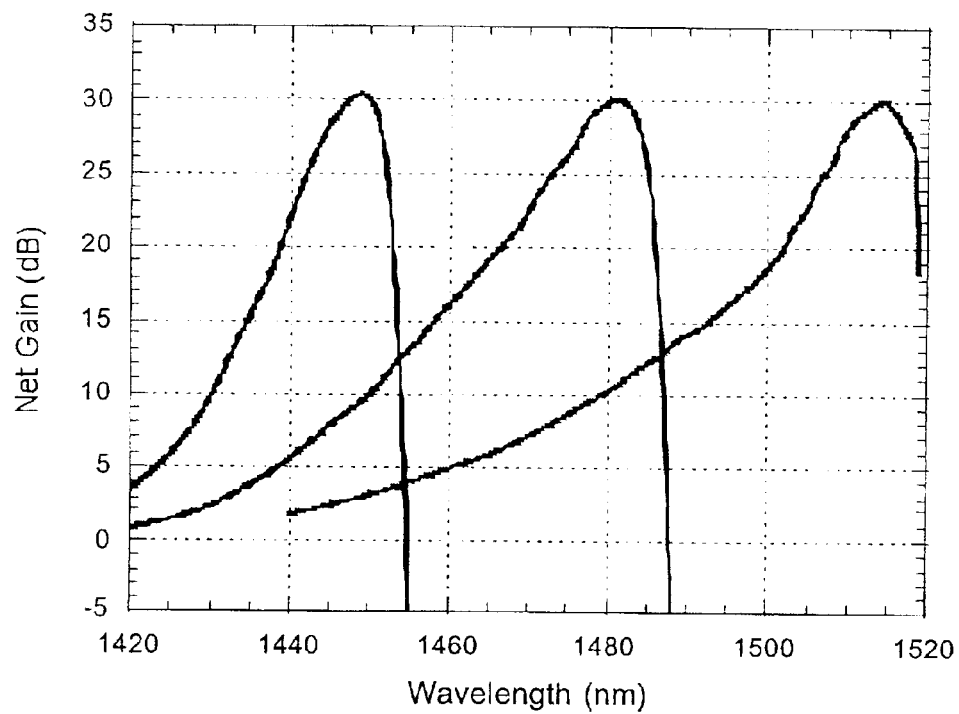
FIG. 11 is a graph illustrating the gain spectra for the three EDFAs of FIG. 10

FIG. 10 illustrates an embodiment in which three EDFAs 102, 104, 106 doped with Er at 0.1% wt. all engineered in accordance with the invention are provided to amplify three portions of the S-band. Four wavelength combiners 108, 110, 112, 114 are used to connect EDFAs 102, 104, 106 in accordance with well-known splicing and wavelength combining procedures to separately amplify the three portions of the S-band. EDFA 102 has a length of 10 meters and a cutoff wavelength $\lambda_c$ at 1520 nm, EDFA 104 has a length of 33 meters and a cutoff wavelength $\lambda_c$ at 1490 nm, and EDFA 106 has a length of 143 meters with a cutoff wavelength $\lambda_c$ at 1460 nm. EDFA 102 amplifies input in the 1490–1520 nm range, EDFA 104 amplifies input in the 1460–1485 nm range and EDFA 106 amplifies input in the 1435–1455 nm range. All EDFAs 102, 104, 106 are engineered for the largest possible slope of $n_{eff}$, i.e., 0.008/1000 nm, near their respective cutoff wavelengths and the indices of refraction are: $n_o$=+0.011 and $n_1$=−0.0053. FIG. 11 illustrates the net gain spectra for these three EDFAs when pumping is sufficiently strong to obtain an inversion D=0.9. Note that they cover about 80 nm of total bandwidth in the S-band and provide gain exceeding 15 dB over this 80 nm bandwidth.

It should be noted that cutoff wavelength in this embodiment is placed in the short wavelength band for EDFAs 104 and 106. In fact, cutoff wavelength can also be placed in the long wavelength band, if desired. The choice of exactly where to place the cutoff wavelength can be made by the designer once the slope of the roll-off is known and the amount of high gains in the long wavelength band to be matched or exceeded are known.

Figure 12:
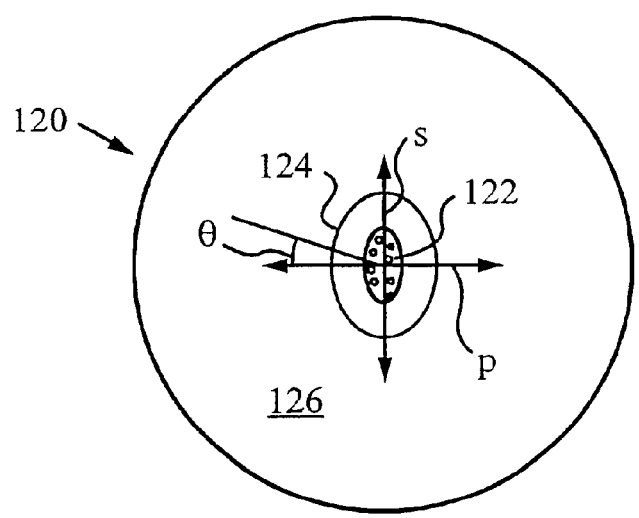
FIG. 12 illustrates the cross-section of another fiber amplifier with an elliptical core and depressed cladding.

Fiber amplifiers according to the invention can be used in fibers whose cores and cladding layers have cross-sections other than circular. For example, FIG. 12 illustrates the cross-section of a fiber amplifier 120 engineered according to the invention and whose core 122 is elliptical. Depressed cladding 124 is also elliptical while secondary cladding 126 has a circular cross section. These elliptical cross sections are advantageous when radiation in one polarization rather than the other polarization is to be maintained during amplification.

It will be clear to one skilled in the art that the above embodiments may be altered in many ways without departing from the scope of the invention. Accordingly, the scope of the invention should be determined by the following claims and their legal equivalents.

What is claimed is:

1. A fiber amplifier comprising:
   a) a core having a core cross-section and a refractive index $n_o$;
   b) an active material doped in said core;
   c) a depressed cladding surrounding said core, said depressed cladding having a depressed cladding cross-section and a refractive index $n_1$;
   d) a secondary cladding surrounding said depressed cladding, said secondary cladding having a secondary cladding cross-section and a refractive index $n_2$;

e) a pump source for pumping said active material to a high relative inversion D, such that said active material exhibits positive gains in a short wavelength band and high gains in a long wavelength band;

wherein said core cross-section, said depressed cladding cross-section, and said refractive indices $n_o$, $n_1$, and $n_2$ are selected to produce a roll-off loss curve about a cutoff wavelength $\lambda_c$, said roll-off loss curve yielding losses at least comparable to said high gains in said long wavelength band and losses substantially smaller than said positive gains in said short wavelength band.

2. The fiber amplifier of claim 1, wherein said refractive index $n_o$ is selected such that an effective index experienced by a mode of radiation confined in said core is selected to provide a roll-off slope of said roll-off loss curve near said cutoff wavelength $\lambda_c$ that is greater than or about equal to the maximum slope of the gain spectrum in said long wavelength band.

3. The fiber amplifier of claim 2, wherein said refractive index $n_o$ is selected such that the slope of said effective index with respect to wavelength near said cutoff wavelength $\lambda_c$ is in the range of 0.002/1000 nm to 0.008/1000 nm.

4. The fiber amplifier of claim 1, wherein said refractive index $n_o$ is at least 0.5% larger than said refractive index $n_2$.

5. The fiber amplifier of claim 1, wherein said cutoff wavelength $\lambda_c$ is contained in said long wavelength band.

6. The fiber amplifier of claim 1, wherein said cutoff wavelength $\lambda_c$ is contained in said short wavelength band.

7. The fiber amplifier of claim 1, wherein said cutoff wavelength $\lambda_c$ is between said short wavelength band and said long wavelength band.

8. The fiber amplifier of claim 1, wherein said active material is Er.

9. The fiber amplifier of claim 8, wherein said short wavelength band comprises at least a portion of the S-band and said long wavelength band comprises at least a portion of the C-band or L-band.

10. The fiber amplifier of claim 9, wherein said cutoff wavelength $\lambda_c$ is set near 1525 nm.

11. The fiber amplifier of claim 9, wherein said roll-off loss curve is selected to yield losses in said S-band smaller by at least 5 dB than said positive gains.

12. The fiber amplifier of claim 8, wherein said fiber comprises a silicate-containing glass.

13. The fiber amplifier of claim 12, wherein said silicate-containing glass is selected from the group consisting of alumino-germanosilicate glass and phosphorus doped germanosilicate glass.

14. The fiber amplifier of claim 8, wherein said Er is present in said core at a concentration of about 0.1% wt.

15. The fiber amplifier of claim 8, wherein said pump source is a laser diode providing pumping radiation at about 980 nm.

16. The fiber amplifier of claim 1, wherein said refractive index $n_o$ of said core differs from said refractive index $n_2$ of said secondary cladding by about 0.005 to about 0.03.

17. The fiber amplifier of claim 1, wherein said refractive index $n_1$ of said depressed cladding differs from said refractive index $n_2$ of said secondary cladding by about −0.004 to about −0.02.

18. The fiber amplifier of claim 1, wherein said core cross-section and said depressed cladding cross-section have shapes selected from the group consisting of circles, ellipses and polygons.

19. The fiber amplifier of claim 1, wherein said pump source provides pump radiation at an intensity sufficient to ensure that said high relative inversion $D \geq 0.7$.

20. The fiber amplifier of claim 1, wherein said roll-off loss curve is selected to yield losses of at least 100 dB in said long wavelength band.

21. A method for designing a fiber amplifier using an active material pumped to a high relative inversion D, said active material exhibiting positive gains in a short wavelength band and high gains in a long wavelength band, said method comprising:

a) providing a core having a core cross-section and a refractive index $n_o$;

b) doping said active material into said core;

c) providing a depressed cladding around said core, said depressed cladding having a depressed cladding cross-section and a refractive index $n_1$;

d) providing a secondary cladding around said depressed cladding, said secondary cladding having a secondary cladding cross-section and a refractive index $n_2$;

e) selecting said core cross section, said depressed cladding cross-section, and said refractive, indices $n_o$, $n_1$, and $n_2$ to produce a roll-off loss curve about a cutoff wavelength $\lambda_c$, said roll-off loss curve yielding losses at least comparable to said high gains in said long wavelength band and losses substantially smaller than said positive gains in said short wavelength band.

22. The method of claim 21, wherein said refractive index $n_o$ is selected such that an effective index experienced by a mode of radiation confined in said core is selected to provide a roll-off slope of said roll-off loss curve near said cutoff wavelength $\lambda_c$ that is greater than or about equal to the maximum slope of the gain spectrum in said long wavelength band.

23. The method of claim 22, wherein said refractive index $n_o$ is selected such that the slope of said effective index with respect to wavelength near said cutoff wavelength $\lambda_c$ is in the range of 0.002/1000 nm to 0.008/1000 nm.

24. The method of claim 21, wherein said refractive index $n_o$ is at least 0.5% larger than said refractive index $n_2$.

25. The method of claim 21, wherein said cutoff wavelength $\lambda_c$ is contained in said long wavelength band.

26. The method of claim 21, wherein said cutoff wavelength $\lambda_c$ is contained in said short wavelength band.

27. The method of claim 21, wherein said cutoff wavelength $\lambda_c$ is contained between said long wavelength band and said short wavelength band.

28. The method of claim 21, wherein said active material is Er, said long wavelength band is at least a portion of the C-band and the L-band and said short wavelength band is at least a portion of the S-band.

29. The method of claim 28, wherein said roll-off loss curve is selected to yield losses of at least 100 dB in said long wavelength band.

30. The method of claim 28, wherein said roll-off loss curve is selected to yield losses in said S-band smaller by at least 5 dB than said positive gains.

31. The method of claim 21, wherein said high relative inversion D is maintained at $D \geq 0.7$.

32. The method of claim 21, further comprising adjusting a length L of said fiber amplifier to yield a predetermined gain over said short wavelength band.

33. A method for pumping a fiber amplifier having a W-profile fiber, said method comprising:

a) providing a core having a core cross-section and a refractive index $n_o$;

b) doping an active material into said core;

c) providing a depressed cladding around said core, said depressed cladding having a depressed cladding cross-section and a refractive index $n_1$;

d) providing a secondary cladding around said depressed cladding, said secondary cladding having a secondary cladding cross-section and a refractive index $n_2$;

e) selecting said core cross section, said depressed cladding cross-section, and said refractive indices $n_o$, $n_1$, and $n_2$ to produce a roll-off loss curve about a cutoff wavelength $\lambda_c$; and f) pumping said active material to a relative inversion $D \geq 0.7$, such that said active material exhibits positive gains in a short wavelength band and high gains in a long wavelength band.

34. The method of claim 33, wherein said active material is Er and said roll-off loss curve provides losses at least comparable to said high gains in said long wavelength band and provides losses substantially smaller than said positive gains in said short wavelength band, wherein said long wavelength band is at least a portion of the C-band or the L-band and said short wavelength band is at least a portion of the S-band.

35. The method of claim 33, wherein said refractive index $n_o$ is selected such that an effective index experienced by a mode of radiation confined in said core is selected to provide a roll-off slope of said roll-off loss curve near said cutoff wavelength $\lambda_c$ that is greater than or about equal to the maximum slope of the gain spectrum in said long wavelength band.

36. The method of claim 35, wherein said refractive index $n_o$ is selected such that the slope of said effective index with respect to wavelength near said cutoff wavelength $\lambda_c$ is in the range of 0.002/1000 nm to 0.008/1000 nm.

37. The method of claim 33, wherein said cutoff wavelength $\lambda_c$ is contained in said long wavelength band.

38. The method of claim 33, wherein said cutoff wavelength $\lambda_c$ is contained between said long wavelength band and said short wavelength band.

39. The method of claim 34, wherein said cutoff wavelength $\lambda_c$ is contained in said S-band.

40. The method of claim 33, wherein said refractive index $n_o$ is at least 0.5% larger than said refractive index $n_2$.

41. A fiber amplifier comprising:

a) a fiber having an erbium-doped region;

b) a mechanism for providing a distributed loss by engineering an index profile in said fiber; and c) a pump source producing a high inversion, wherein the gain at a wavelength below 1525 nm exceeds the distributed loss at said wavelength below 1525 nm by at least 5 dB, and wherein the distributed loss in a wavelength band longer than 1525 nm exceeds the gain in said wavelength band longer than 1525 nm.

42. A fiber amplifier comprising:

a) a fiber having an erbium-doped region;

b) a mechanism for providing a distributed loss within said fiber; and c) a pump source producing a high inversion, wherein the gain at a wavelength below 1525 nm exceeds the distributed loss at said wavelength below 1525 nm by at least 5 dB, and wherein the distributed loss in a wavelength band longer than 1525 nm exceeds the gain in said wavelength band longer than 1525 nm.

43. The fiber amplifier of claim 42, wherein said distributed loss is provided by engineering an index profile in said fiber.

* * * * *